(12) United States Patent
Wang

(10) Patent No.: US 7,986,525 B2
(45) Date of Patent: Jul. 26, 2011

(54) SUPPORT MECHANISM AND ELECTRONIC DEVICE USING THE SAME

(75) Inventor: Shao-Ying Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 150 days.

(21) Appl. No.: 12/546,597

(22) Filed: Aug. 24, 2009

(65) Prior Publication Data

US 2011/0007466 A1    Jan. 13, 2011

(30) Foreign Application Priority Data

Jul. 10, 2009   (CN) .......................... 2009 1 0304233

(51) Int. Cl.
   G06F 1/16      (2006.01)
   A47B 81/00     (2006.01)
   E05C 17/56     (2006.01)
   E05D 11/10     (2006.01)
   H04M 1/00      (2006.01)

(52) U.S. Cl. ......... 361/679.59; 361/679.55; 361/679.56; 312/223.2; 292/251.5; 16/320; 455/575.1; 455/575.3

(58) Field of Classification Search .......... 361/679.01–679.45, 679.55–679.59; 312/223.1, 223.2; 400/681–682, 472; 292/251.5; 16/221–392; 455/575.1, 575.3, 575.4
See application file for complete search history.

(56) References Cited

U.S. PATENT DOCUMENTS

| | | | |
|---|---|---|---|
| 6,151,486 A * | 11/2000 | Holshouser et al. | 455/575.3 |
| 6,630,878 B2 * | 10/2003 | Pan et al. | 335/285 |
| 2002/0022496 A1 * | 2/2002 | Park | 455/550 |
| 2002/0173281 A1 * | 11/2002 | Kobayashi | 455/90 |
| 2007/0077972 A1 * | 4/2007 | Tu et al. | 455/575.3 |
| 2007/0149260 A1 * | 6/2007 | Satoh et al. | 455/575.1 |

* cited by examiner

*Primary Examiner* — Jayprakash N Gandhi
*Assistant Examiner* — Nidhi Desai
(74) *Attorney, Agent, or Firm* — Clifford O. Chi

(57) ABSTRACT

A support mechanism includes a connecting portion and a support member. The support member includes a main body rotatably connected to the connecting portion and a support portion extending from one end of the main body. A first magnet is positioned on the connecting portion. A second magnet is positioned on the support member. The magnetic force generated between the first magnet and the second magnet rotates the support member relative to the connecting portion. An electronic device using the same is also provided.

13 Claims, 5 Drawing Sheets

SUPPORT MECHANISM AND ELECTRONIC DEVICE USING THE SAME

BACKGROUND

1. Technical Field

The present disclosure generally relates to a support mechanism and an electronic device using the same.

2. Description of Related Art

Keyboards are widely used as a data input device, and generally, bottom surfaces thereof contact a supporting surface such as a table top. However, this configuration can easily contribute to user fatigue.

A typical support mechanism positioned on one end of a main body of a keyboard is provided to support the keyboard. The support mechanism includes a a pivot shaft and a support member rotatably connected to the main body of the keyboard via the pivot shaft. The main body defines a receiving slot. When not in use, the support member is received in the receiving slot of the keyboard. When in use, the support member rotates relative to the main body to support the keyboard, providing an angle between the main body of the keyboard and the surface to enhance usability.

However, the support member of the support mechanism must be manually deployed throughout the entire rotation, presenting an inconvenience to the user.

Therefore, a support mechanism and an electronic device using the same are desirable to overcome the described limitations.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
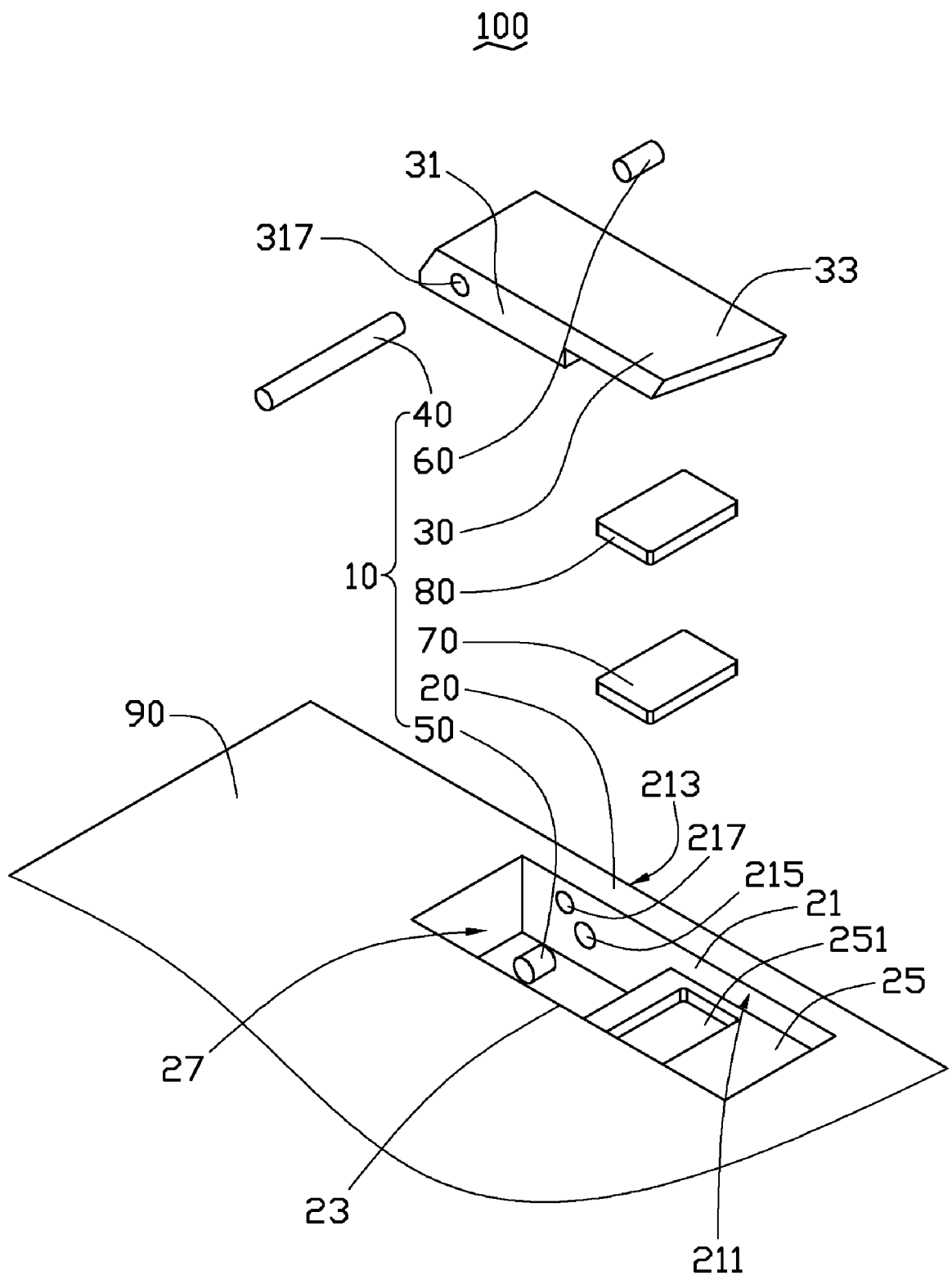
FIG. 1 is a partial, exploded, isometric view of an embodiment of an electronic device and an embodiment of a support mechanism employed in the electronic device.
Figure 2:
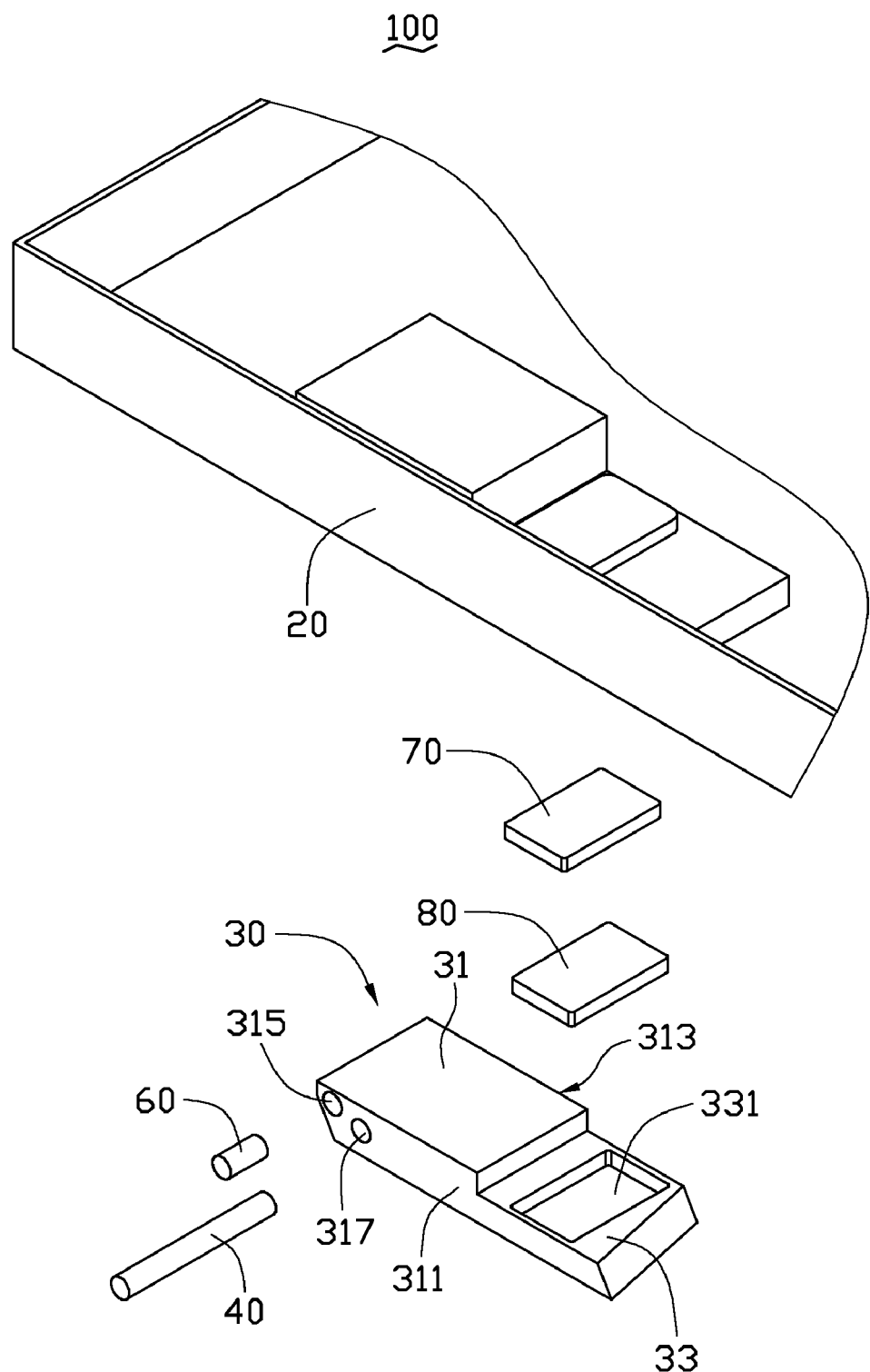
FIG. 2 is similar to FIG. 1, but viewed from another aspect.

Referring to FIG. 1 and FIG. 2, an embodiment of an electronic device 100 includes a main body 90 and a support mechanism 10 positioned thereon. In the illustrated embodiment, the electronic device 100 is a keyboard. The support mechanism 10 includes a connecting portion 20, a support member 30, a pivot shaft 40, a first magnet 50, a second magnet 60, a third magnet 70, and a fourth magnet 80. The connecting portion 20 formed on the main body 90 includes a first sidewall 21, a second sidewall 23, a bottom wall 25, and a receiving slot 27 enclosed thereby. The first sidewall 21 and the second sidewall 23 are opposite to each other and connected by the bottom wall 25. The first sidewall 21 includes a first side surface 211 and a second side surface 213 opposite to each other. The first sidewall 21 defines a receiving hole 215 and an assembly hole 217 extending from the first side surface 211 to the second side surface 213. The second sidewall 23 defines an assembly hole (not shown). An engaging slot 251 is defined in the bottom wall 25. The receiving slot 27 is adjacent to one end of the main body 90. The receiving hole 215 is at the upper inclined area of the assembly hole 217. The first magnet 50, the second magnet 60, the third magnet 70, and the fourth magnet 80 are permanent magnets. The polarities of the first magnet 50 and the second magnet 60 are opposite, as are those of the third magnet 70 and the fourth magnet 80.

The support member 30 includes a body 31 and a support portion 33 extending from one end thereof. The body 31 includes a first side surface 311 and a second side surface 313 opposite to each other. The body 31 defines a receiving hole 315 and an assembly hole 317 extending from the first side surface 311 to the second side surface 313. An assembly slot 331 is formed in the support portion 33. In the illustrated embodiment, the assembly hole 317 is between the receiving hole 315 and the support portion 33.

Figure 3:
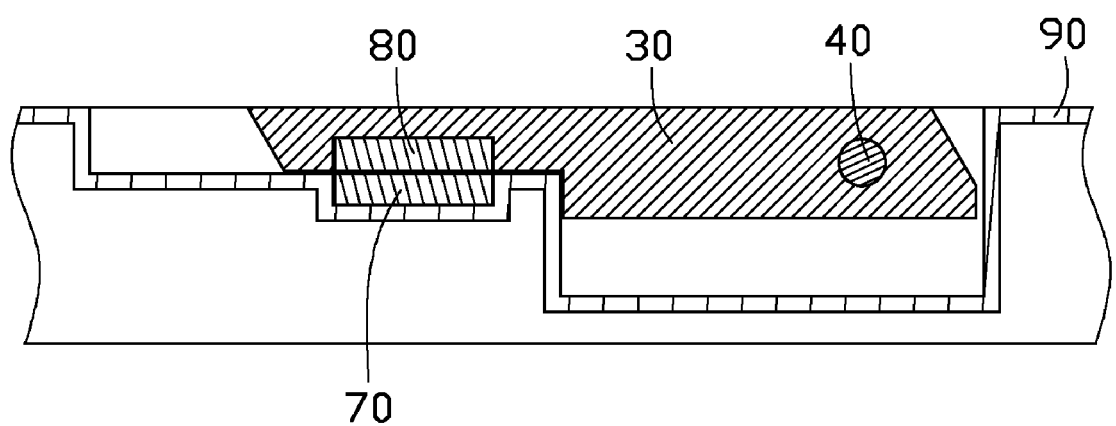
FIG. 3 is an assembled cross-section of the electronic device in FIG. 1.

Referring also to FIG. 3, during assembly of the support mechanism 10 to the electronic device 100, the first magnet 50 engages in the receiving hole 215 of the first sidewall 21. The third magnet 70 is positioned in the engaging slot 251 of the bottom wall 25. The second magnet 60 engages in the receiving hole 315 of the support member 30. The fourth magnet 80 is positioned in the assembly slot 331. The support member 30 is received in the receiving slot 27 with the fourth magnet 80 facing the third magnet 70. The pivot shaft 40 passes through the assembly hole 317 of the support member 30, and two ends of the pivot shaft 40 are received in the assembly hole 217 of the first side wall 21 and the assembly hole of the second sidewall 23. The first side surface 211 of the first sidewall 21 faces the first side surface 311 of the support member 30. The support member 30 is stably received in the receiving slot 27 by the magnetic attractive forces between the third magnet 70 and the fourth magnet 80. In the illustrated embodiment, the first magnet 50, the second magnet 60, the third magnet 70, and the fourth magnet 80 are positioned on the connecting portion 20 or the support member 30 by double-sided tape.

Figure 4:
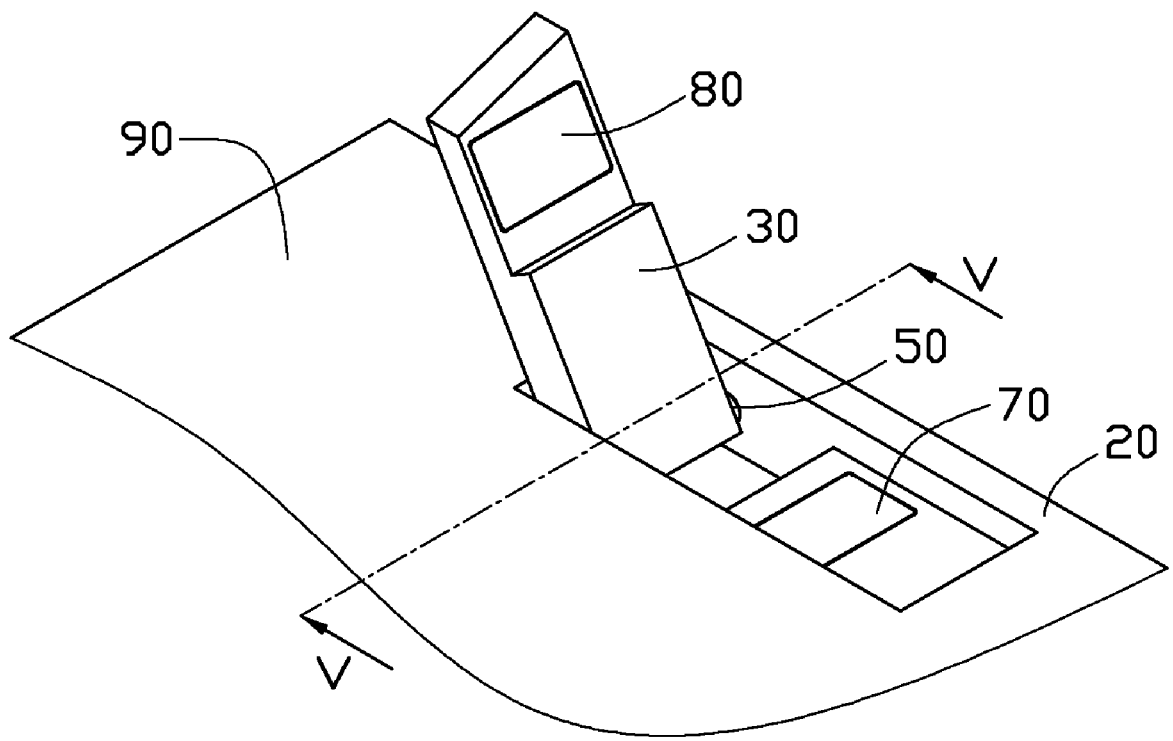
FIG. 4 is an isometric view of the electronic device in FIG. 3, showing a support member of the support mechanism opened.
Figure 5:
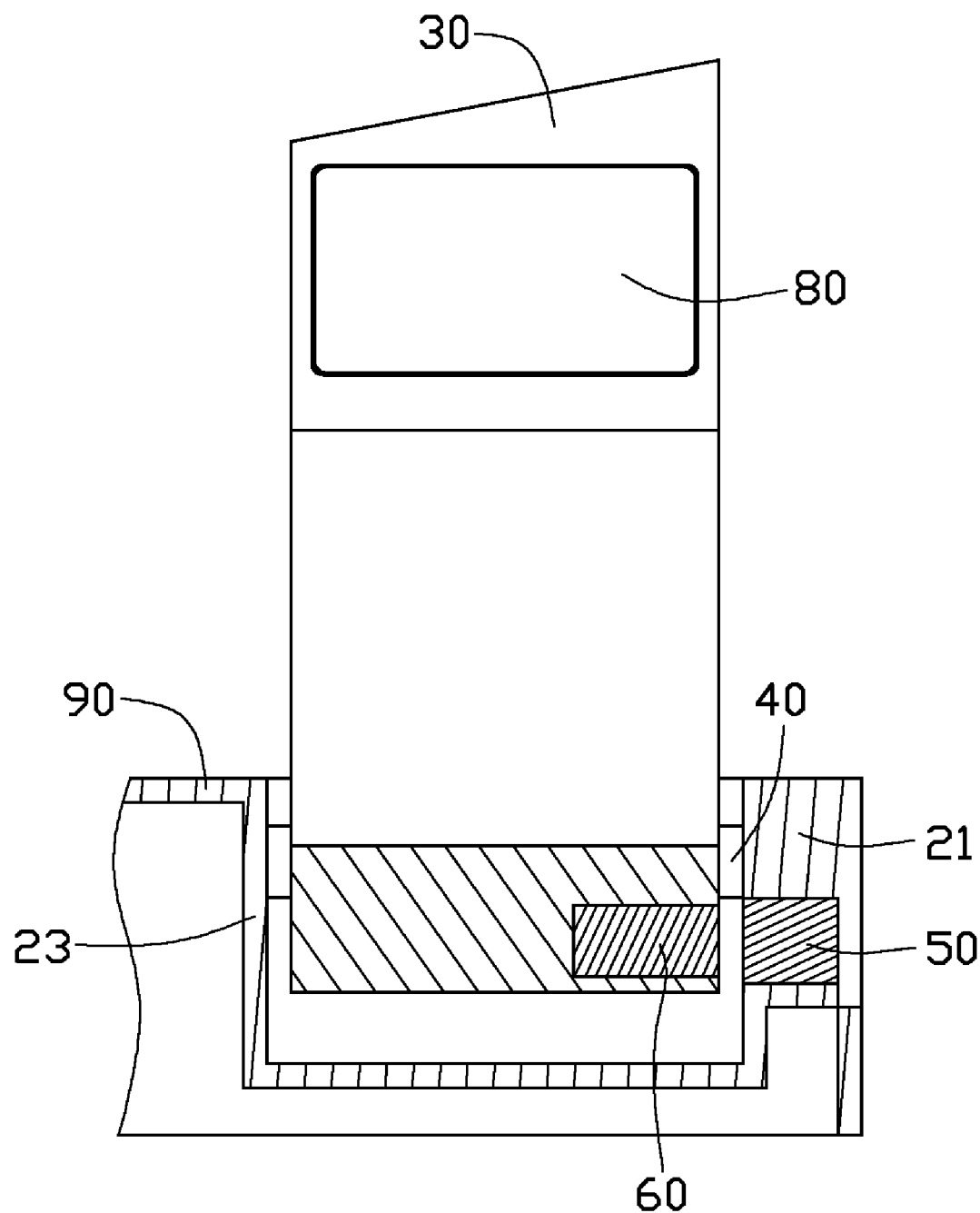
FIG. 5 is a cross-section along line V-V of the electronic device in FIG. 4.

Referring also to FIG. 4 and FIG. 5, when the support member 30 is rotated by an external force, attractive forces generated between the first magnet 50 and the second magnet 60 increases. When the attractive force between the first magnet 50 and the second magnet 60 exceeds the attractive force generated between the third magnet 70 and the fourth magnet 80, the support member 30 is rotated automatically by the greater attractive forces generated between the first magnet 50 and the second magnet 60. An angle between the electronic device 100 and a supporting surface is created when the first magnet 50 directly faces the second magnet 60. When not in use, the support member 30 is rotated by an external force with the support portion 33 moving towards the main body 90. When the attractive force generated between the third magnet 70 and the fourth magnet 80 exceeds the attractive force generated between the first magnet 50 and the second magnet 60, the support portion 33 returns to the receiving slot 27 automatically.

Since the support portion 33 of the support member 30 automatically rotates away from or returns to the receiving slot 27 once the support member 30 rotates a certain distance by an external force and depending on the attractive forces generated between the first magnet 50 and the second magnet 60, or the third magnet 70, and the fourth magnet 80, the electronic device can be conveniently used and decrease user fatigue. In addition, the support portion 33 of the support member 30 is stably received in the electronic device 100 by the attractive force generated between the third magnet 70 and the fourth magnet 80.

It can be understood that the angle formed between the main body 90 and the support member 30 is changeable when the positions of the receiving hole 215, 313 or the magnetic intensity of the magnet is changed. In addition, the third magnet 70 and the fourth magnet 80 may be omitted when at least one of the first magnet 50 and the second magnet 60 is an electromagnet. The support mechanism 10 can further include a control module, used to adjust the polarity of the electromagnet. Thus, the support portion 33 of the support member 30 can be rotated away from or returned to the receiving slot 27 with an attractive or repulsive force generated between the first magnet 50 and the second magnet 60.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

The invention claimed is:

1. A support mechanism, comprising: a connecting portion; a support member comprising a body rotatably connected to the connecting portion and a support portion extending from one end of the body; a first magnet positioned on the connecting portion; and a second magnet positioned on the support member, wherein the support portion of the support member rotates relative to the connecting portion by a magnetic force generated between the first magnet and the second magnet, away from or toward the connecting portion; wherein the first magnet and the second magnet are permanent magnets of opposite polarities; wherein the support mechanism further comprising a third magnet positioned on the connecting portion, and a fourth magnet positioned on the support portion, wherein the support portion of the support member is fixed to the connecting portion with the attractive force generated between the third magnet and the fourth magnet; and wherein the connecting portion comprises a first sidewall and a bottom wall; the first magnet is positioned on the first sidewall, the second magnet is positioned on the body, the third magnet is positioned on the bottom wall and the fourth magnet is positioned on the support portion.

2. The support mechanism of claim 1, wherein at least one of the first magnet and the second magnet is an electromagnet, and the support portion of the support member rotates away from or towards the connecting portion with an attracting or repulsive force respectively generated between the first magnet and the second magnet.

3. The support mechanism of claim 1, wherein the connecting portion further comprises a second sidewall opposite to the first sidewall and connecting with the first sidewall by the bottom wall; the first sidewall, the second sidewall, and the bottom sidewall cooperatively define a receiving slot; the support member is rotatably received in the receiving slot.

4. The support mechanism of claim 3, wherein the body of the support member defines an assembly hole; the support mechanism further comprising a pivot shaft received in the assembly hole, wherein two ends of the pivot shaft connect with the first sidewall and the second sidewall.

5. The support mechanism of claim 4, wherein the pivot shaft is between the second magnet and the support portion.

6. The support mechanism of claim 5, wherein the bottom wall of the connecting portion defines an engaging slot, and the support portion defines an assembly slot; the third magnet is positioned in the engaging slot and the fourth magnet is positioned in the assembly slot.

7. A support mechanism, comprising: a connecting portion, comprising a first sidewall and a receiving slot partially enclosed by the first sidewall; a support member, rotatably received in the receiving slot, the support member comprising a body connected to the connecting portion and a support portion extending from one end of the body; a first magnet positioned on the first sidewall; and a second magnet positioned on the body, wherein a force generated between the first magnet and the second magnet impels the support portion to be received in or rotate away from the receiving slot; wherein the support mechanism further comprising a third magnet positioned on the connecting portion, and a fourth magnet positioned on the support member; the support portion is fixed to the connecting portion stably with attractive force generated between the third magnet and the fourth magnet, the support portion being rotated away from the connecting portion stably with attractive force generated between the first magnet and the second magnet.

8. An electronic device, comprising: a main body; and a support mechanism, comprising: a connecting portion; a support member comprising a body rotatably connected to the connecting portion and a support portion extending from one end of the body; a first magnet positioned on the connecting portion; and a second magnet positioned on the support member, wherein the support portion of the support member rotates relative to the connecting portion by a magnetic force generated between the first magnet and the second magnet, away from or toward the connecting portion; wherein the first magnet and the second magnet are permanent magnets of opposite polarities; the electronic device further comprising a third magnet positioned on the connecting portion, and a fourth magnet positioned on the support portion; the support portion of the support member is fixed to the connecting portion with the attractive force generated between the third magnet and the fourth magnet; and wherein the connecting portion comprises a first sidewall and a bottom wall; the first magnet is positioned on the first sidewall, the second magnet is positioned on the body, the third magnet is positioned on the bottom wall and the fourth magnet is positioned on the support portion.

9. The electronic device of claim 8, wherein at least one of the first magnet and the second magnet is an electromagnet, and the support portion of the support member rotates away from or towards the connecting portion with an attracting or repulsive force respectively generated between the first magnet and the second magnet.

10. The electronic device of claim 8, wherein the connecting portion further comprises a second sidewall opposite to the first sidewall and connecting with the first sidewall by the bottom wall; the first sidewall, the second sidewall, and the bottom sidewall cooperatively define a receiving slot; the support member is rotatably received in the receiving slot.

11. The electronic device of claim 10, wherein the body of the support member defines an assembly hole; the support mechanism further comprising a pivot shaft received in the assembly hole, wherein two ends of the pivot shaft connect with the first sidewall and the second sidewall.

12. The support mechanism of claim 11, wherein the pivot shaft is between the second magnet and the support portion.

13. The support mechanism of claim 12, wherein the bottom wall of the connecting portion defines an engaging slot, and the support portion defines an assembly slot; the third magnet is positioned in the engaging slot and the fourth magnet is positioned in the assembly slot.

* * * * *